US008972182B1

(12) United States Patent
Foxlin

(10) Patent No.: US 8,972,182 B1
(45) Date of Patent: Mar. 3, 2015

(54) INDOOR/OUTDOOR PEDESTRIAN NAVIGATION

(75) Inventor: Eric Foxlin, Arlington, MA (US)

(73) Assignee: Thales Visionix, Inc., Clarksburg, MD (US)

( * ) Notice: Subject to any disclaimer, the term of this patent is extended or adjusted under 35 U.S.C. 154(b) by 170 days.

(21) Appl. No.: 12/540,819

(22) Filed: Aug. 13, 2009

Related U.S. Application Data

(62) Division of application No. 11/399,289, filed on Apr. 6, 2006, now abandoned.

(60) Provisional application No. 60/668,941, filed on Apr. 6, 2005.

(51) Int. Cl.
*G01C 21/20* (2006.01)

(52) U.S. Cl.
USPC ........................................ 701/519; 342/357.3

(58) Field of Classification Search
USPC ............. 701/200; 340/539.13; 36/25, 34, 103
See application file for complete search history.

(56) References Cited

U.S. PATENT DOCUMENTS

| | | | | |
|---|---|---|---|---|
| 2,174,931 | A * | 10/1939 | Houlton et al. ................... | 352/51 |
| 3,840,726 | A | 10/1974 | Harrison | |
| 4,767,122 | A * | 8/1988 | Rusche ....................... | 273/348.1 |
| 5,579,165 | A | 11/1996 | Michel et al. .................. | 359/630 |
| 5,615,132 | A | 3/1997 | Horton et al. | |
| 5,955,667 | A | 9/1999 | Fyfe | |
| 5,956,660 | A | 9/1999 | Neumann | |
| 6,122,960 | A | 9/2000 | Hutchings et al. ............... | 73/493 |
| 6,321,158 | B1 * | 11/2001 | DeLorme et al. ............. | 701/201 |
| 6,366,855 | B1 | 4/2002 | Reilly et al. .................. | 701/213 |
| 6,594,617 | B2 | 7/2003 | Scherzinger .................. | 702/160 |
| 6,813,582 | B2 | 11/2004 | Levi et al. ..................... | 702/141 |
| 6,842,991 | B2 | 1/2005 | Levi et al. ........................ | 33/356 |
| 2002/0143491 | A1* | 10/2002 | Scherzinger .................. | 702/160 |
| 2003/0018430 | A1 | 1/2003 | Ladetto et al. ................ | 701/217 |
| 2003/0179249 | A1* | 9/2003 | Sauer et al. ................... | 345/848 |
| 2006/0036947 | A1* | 2/2006 | Jelley et al. ................... | 715/722 |
| 2007/0168376 | A1* | 7/2007 | Luitjens et al. ................ | 707/102 |
| 2008/0064947 | A1* | 3/2008 | Heruth et al. .................. | 600/407 |
| 2009/0027502 | A1* | 1/2009 | Yang ............................. | 348/169 |
| 2010/0045783 | A1* | 2/2010 | State et al. ...................... | 348/53 |
| 2010/0256504 | A1* | 10/2010 | Moreau-Gaudry et al. | 600/476 |

OTHER PUBLICATIONS

William Frey, Michael Zyda, Robert McGhee, Bill Cockayne, Off-the-Shelf, Real-Time, Human Body Motion Capture for Synthetic Environments, 1995, Computer Science Department, Navel Postgraduate School, Monterey, CA 93943-5118.
Elwell, "Inertial navigation for the urban warrior," Part of the SPIE Conference on Digitization of the Batttlespace IV, 3709:196-204 (1999).
Verplaetse, "Inertial proprioceptive devices: Self-motion-sensing toys and tools," IBM Systems Journal 35 (3&4):639-650 (1996).

* cited by examiner

*Primary Examiner* — John Q Nguyen
*Assistant Examiner* — Kyung Kim
(74) *Attorney, Agent, or Firm* — Arent Fox LLP

(57) ABSTRACT

Among other things, positioning a magnetic instrument on a pedestrian; positioning an inertial instrument on a foot of a pedestrian; receiving positioning signals at the pedestrian; aligning the inertial instrument based in part on the received positioning signals; calibrating the magnetic instrument using the inertial instrument; and tracking the pedestrian using the calibrated magnetic instrument and the inertial instrument.

25 Claims, 4 Drawing Sheets

INDOOR/OUTDOOR PEDESTRIAN NAVIGATION

CLAIM OF PRIORITY

This divisional application claims the benefit of U.S. application Ser. No. 11/399,289, which was filed on Apr. 6, 2006, which claims the benefit of U.S. Provisional Application No. 60/668,941, which was filed on Apr. 6, 2005, which are incorporated herein by reference in their entirety.

BACKGROUND

Human navigation systems exist which track the motion of a pedestrian as he moves through space. These navigation systems can be made small enough to be wearable by the pedestrian being tracked. For example, global positioning satellites ("GPS"), electromagnetic emitters/receivers, and inertial units such as accelerometers and gyroscopes have been used in such navigation systems.

SUMMARY

In general, in one aspect, positioning a magnetic instrument on a pedestrian; positioning an inertial instrument on a foot of a pedestrian; receiving positioning signals at the pedestrian; aligning the inertial instrument based in part on the received positioning signals; calibrating the magnetic instrument using the inertial instrument; and tracking the pedestrian using the calibrated magnetic instrument and the inertial instrument.

Implementations may include one or more of the following features: The magnetic instrument includes a magnetic compass. The inertial instrument includes a gyroscope. The inertial instrument includes an accelerometer. Positioning the magnetic instrument includes positioning the magnetic instrument on the foot of the pedestrian. The positioning signals include global navigation satellite system signals. The positioning signals include local positioning signals associated with locations in an environment of the pedestrian. The local positioning signals are associated with another pedestrian in the environment of the pedestrian. The positioning signals are generated based on a map of the environment of the pedestrian. Generating the map of the environment. Calibrating the magnetic instrument includes matching a heading based on the magnetic instrument and a heading based on inertial instrument. Aligning the inertial instrument includes matching a heading based on the inertial instrument and a heading based on received positioning signals. Positioning the inertial instrument on the foot of the pedestrian includes positioning the inertial instrument in or on an article of footwear, and Positioning the article of footwear on the foot of the pedestrian. Tracking the pedestrian includes determining a heading. Tracking the pedestrian includes determining a position of the pedestrian. Tracking the pedestrian includes determining a velocity of the pedestrian. Determining a calibration time for the inertial instrument; and calibrating the inertial instrument at the calibration time. The foot of the pedestrian is stationary at the calibration time. Tracking the pedestrian includes measuring an ambient magnetic field with the magnetic instrument, and the method further includes measuring the ambient magnetic field only during the calibration time.

Measuring the ambient magnetic field occurs only once during the calibration time. Tracking the pedestrian includes processing outputs of the inertial instrument and calibrated magnetic instrument with a prediction/correction routine. The prediction/correction routine includes an extended Kalman filter. Determining a calibration time for the inertial instrument, and calibrating the inertial instrument at the calibration time, where calibrating the inertial instrument includes supplying a value of 0 to the extended Kalman filter as representative of the output of the inertial instrument. The value of 0 is supplied without regard to the output of the inertial instrument at the calibration time. Detecting a stride length of the pedestrian. Detecting the stride length includes emitting a sonic pulse at one foot of the pedestrian, and receiving the sonic pulse at another foot of the pedestrian.

In general, in another aspect, positioning a navigation unit on a pedestrian having an item to be tracked, in which the navigation unit has a light source and a navigation unit reference frame, and the item to be tracked has tracking hardware and an item reference frame; displaying an image using the light source tracking the item to be tracked, based on a signal generated by the hardware indicative of the spatial relation between the navigation reference frame and the item reference frame.

Implementations may include one or more of the following features. The item to be tracked includes a head of the pedestrian. The item to be tracked includes an object carried by the pedestrian. The tracking hardware includes a camera. The tracking hardware further includes an optical filter that is opaque to substantially all wavelengths of light except wavelengths of the light source of the navigation unit. Tracking the item includes determining a position of the item relative to the navigation reference frame. Tracking the item includes determining an orientation of the item relative to the navigation reference frame. Tracking the item includes determining a position of the item relative to the Earth. Tracking the item includes determining an orientation of the item relative to the Earth.

Other aspects include other combinations of the features recited above and other features, expressed as methods, apparatus, systems, program products, and in other ways. Other features and advantages will be apparent from the description and from the claims.

DESCRIPTION

FIG. 1 is a schematic view of a navigation system.

FIG. 2A-B are schematic views of footwear with an incorporated a measurement unit.

Introduction

Pedestrian navigation systems are used in a variety of contexts, for example tracking emergency rescue workers, soldiers on a battlefield, or for providing location-aware computing applications. Satellite-based navigation systems, such as GPS trackers, provide one way of tracking pedestrians. However, such systems can have limited applicability. For example, a pedestrian can only be tracked by satellite-based navigation system when the pedestrian is "visible" to a sufficient number of satellites. This may not be the case, for example, when the pedestrian is in a heavily forested area or inside a building.

Inertial navigation systems also offer a way to track pedestrians. However, inertial navigation systems generally do not allow accurately tracking a pedestrian for long periods of time, because of inertial instruments' tendency to drift.

As described below, in some examples, a "hybrid" navigation system with a GPS receiver and inertial instruments is capable of accurately tracking a pedestrian even during GPS outages.

Basic Hardware

Figure 1:
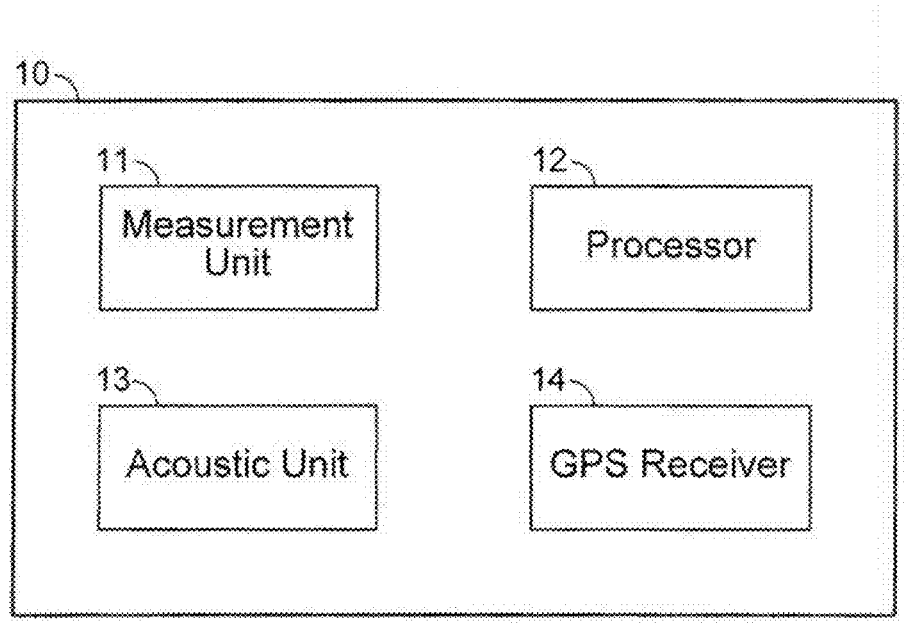
Figure 2A:
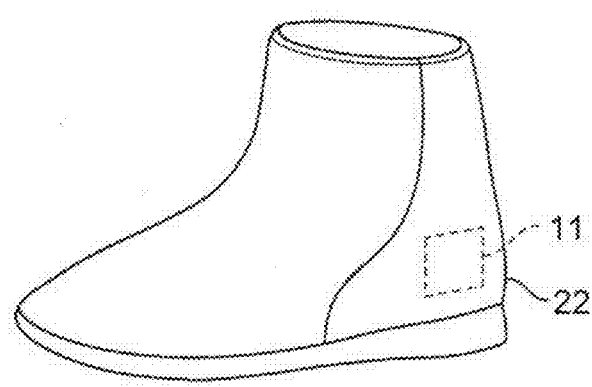
Figure 2B:
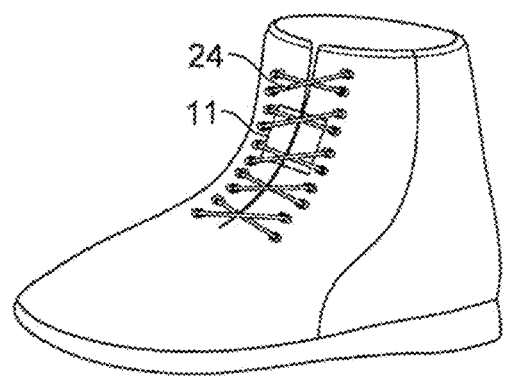

Referring to FIG. 1, a navigation system 10 is capable of determining its position and orientation as it moves. Thus, the navigation system 10 can be mounted on a pedestrian to track the pedestrian's movements. The measurement unit 11 includes inertial instruments that detect linear and/or angular accelerations experienced by the measurement unit 11, and generate signals indicative of such acceleration. The measurement unit 11 is mounted on the pedestrian in such a way that the measurement unit 11 is motionless when the pedestrian's foot is motionless. For example, FIG. 2A shows the measurement unit 11 fixedly mounted in the heel 22 of a shoe or a boot worn by the pedestrian. FIG. 2B shows the measurement unit 11 incorporated in the laces 24 of a shoe or boot worn by the pedestrian. For tracking a crawling person, measurement unit 11 may also be mounted on a hand, knee, or other part of the pedestrian that periodically remains motionless during crawling.

Referring again to FIG. 1, the navigation system 10 also includes a GPS receiver 14. The GPS receiver 14 may be carried by the pedestrian in a backpack, mounted on a belt, or generally mounted anywhere else on or near the pedestrian's body. The GPS receiver 14 receives signals from a constellation of satellites, and based on these signals generates a GPS signal that is sent to the processor 12. Based in part on the GPS signal, the navigation system 10 determines the pedestrian's position, velocity, etc. However, when the pedestrian is indoors or in a heavily forested area, the GPS receiver 14 may not receive sufficiently many signals from the satellites to be useful in determining the pedestrian's position, velocity, etc. Under these circumstances, the navigation system 10 relies on the signals generated by the measurement unit 11.

The processor 12 is in data communication with the GPS receiver 14 and with the measurement unit 11. The processor 12 processes the signals received from the GPS receiver 14 and the measurement unit 11 and determines the pedestrian's position, heading, velocity, etc. For example, in some implementations, the processor 12 may be a microprocessor in a cellular telephone, or hand-held/laptop computer carried by the pedestrian. In other implementations, the processor 12 may be integrated with other components of the navigation system 10, such as the measurement unit 11. In some implementations, the data communication between the processor 12 and other components of the navigation system 10 is implemented wirelessly. In some implementations, the data communication between the processor 12 and other components of the navigation system 10 is implemented by a physical connection between the processor 12 and the other components.

The magnetometers $32x$, $32y$, $32z$ of the measurement unit 11 provide signals that can be processed to determine a magnetic compass heading. When GPS is available, the compass is calibrated using the GPS signal. The calibration enables the compass to determine the pedestrian's heading relative to geographic (or "true") north, as opposed to a compass heading of magnetic "north," which may itself deviate from true magnetic north due to local magnetic field variation. During periods of GPS outage, the compass heading is used in conjunction with the inertial instruments to robustly track the pedestrian.

Figure 3:
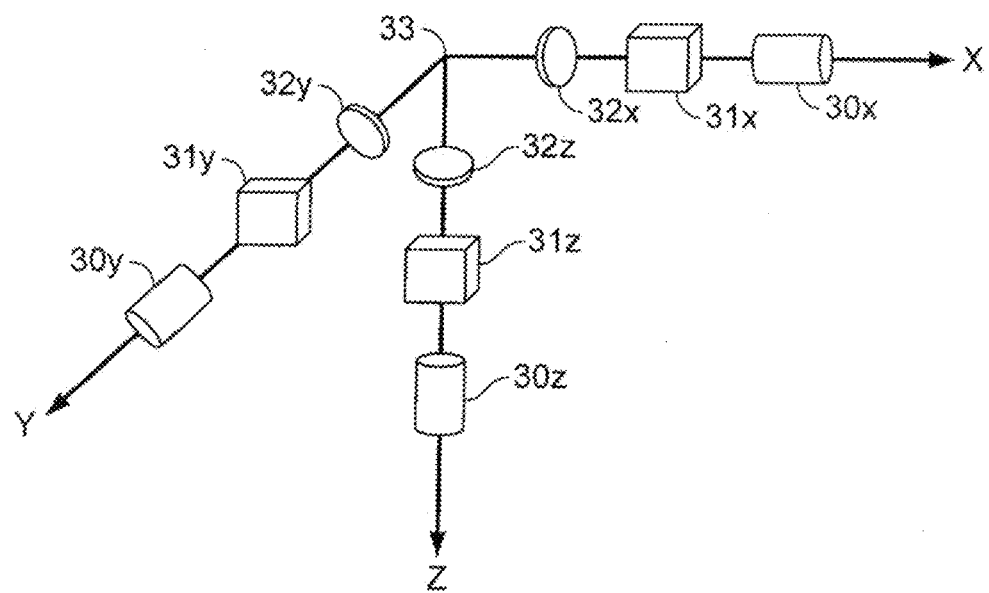
FIG. 3 is a schematic view of a measurement unit.

Referring to FIG. 3, the measurement unit 11 of the navigation system 10 (see FIG. 1) contains inertial and magnetic instruments. The inertial instruments include accelerometers $30x$, $30y$, $30z$ and gyroscopes $31x$, $31y$, $31z$. The magnetic instruments include magnetometers $32x$, $32y$, $32z$. Each inertial or magnetic instrument has an input axis. Each of the accelerometers $30x$, $30y$, $30z$ detects acceleration in a direction parallel to its input axis. Each of the gyroscopes $31x$, $31y$, $31z$ detect angular rotation about its input axis. Each magnetometer detects the strength of a magnetic field that is parallel to its input axis.

In some implementations, the instruments are arranged and rigidly secured so that the input axes of each group of instruments (accelerometers $30x$, $30y$, $30z$, gyroscopes $31x$, $31y$, $31z$, or magnetometers $32x$, $32y$, $32z$) form an orthogonal reference frame. In some implementations, the coordinate frames defined by all three families of instruments are coincident. Any of these coordinate frames can be referred to as the "body frame," or b-frame 33. The navigation reference frame, or "n-frame," is a reference frame in which the navigation system 10 is tracked. For example, one n-frame has x-, y-, and z-coordinate axes corresponding to North, East, and down, respectively.

In some implementations, the measurement unit 11 contains only inertial instruments. In these implementations, the navigation system 10 contains magnetometers $32x$, $32y$, $32z$ positioned with a trackable orientation with respect to the measurement unit 11. For example, the magnetometers $32x$, $32y$, $32z$ need not be positioned on the pedestrian's foot, as shown in FIGS. 2A and 2B.

The measurement unit 11 may be an InertiaCube™, available from InterSense Inc. of Bedford, Mass. The experimental data in Appendix A was obtained using an InertiaCube™ 3 for a measurement unit 11. The inertial or magnetic instruments may be micro-electro-mechanical systems (MEMS). The gyroscopes $31x$, $31y$, $31z$ may be coriolis gyroscopes.

In some examples, the navigation unit 10 also includes hardware to measure the distance from one of the pedestrian's feet to another. Such information can be used by the navigation system 10 to track the pedestrian. For example, the navigation system can include an acoustic unit 13. The acoustic unit 13 includes one or more ultrasonic receivers, one or more ultrasonic emitters, a thermometer, and communication equipment for implementing data communication between the components and with the processor 12.

To determine relative position of the pedestrian's feet, in some examples, a small package housing ultrasonic receivers and associated detection electronics is mounted on the inside of the one of the pedestrian's boots, facing a similar package containing two emitters mounted on the inside of the other boot. Both the emitters and the receivers are mounted on the pedestrian's foot. They may be mounted several inches off the ground, to clear mud and grass. By measuring the range between each emitter and both receivers, a 2-D displacement vector of one boot relative to the other can be calculated at each step and used to provide additional information into the sensor fusion filters. Using just one emitter and one receiver, a scalar distance between the foot can be measured and used to provide additional information to the sensor fusion filters.

The emitters can emit a pulse at any time. In some examples, the emitters emit a pulse in response to a signal. The signal can be generated when one or both of the pedestrian's feet are at rest. (The resting condition of the pedestrian's feet can be determined by the measurement unit 11. See Appendix A.) Acoustic range measurements are made between the transmitters and receivers with unidirectional time-of-flight measurements.

In some examples, the navigation system 10 can have a second measurement unit mounted on the pedestrian's other foot. The two measurement units can be used to enhance the accuracy of the navigation system 10. For example, tracking-related conclusions made independently from the separate measurement units may be averaged or combined in other ways. Typically, when this is done, errors associated with each measurement unit tend to cancel each other.

The navigation system 10 tracks a broad range of movement, including backwards and sideways steps, using signals provided by the measurement unit 11, including using angular or linear acceleration in any direction that is detected by the measurement unit 11 and resolved into components parallel to each b-frame axis. Magnetic fields in any direction are similarly detected and resolved by the measurement unit 11.

Figure 4:
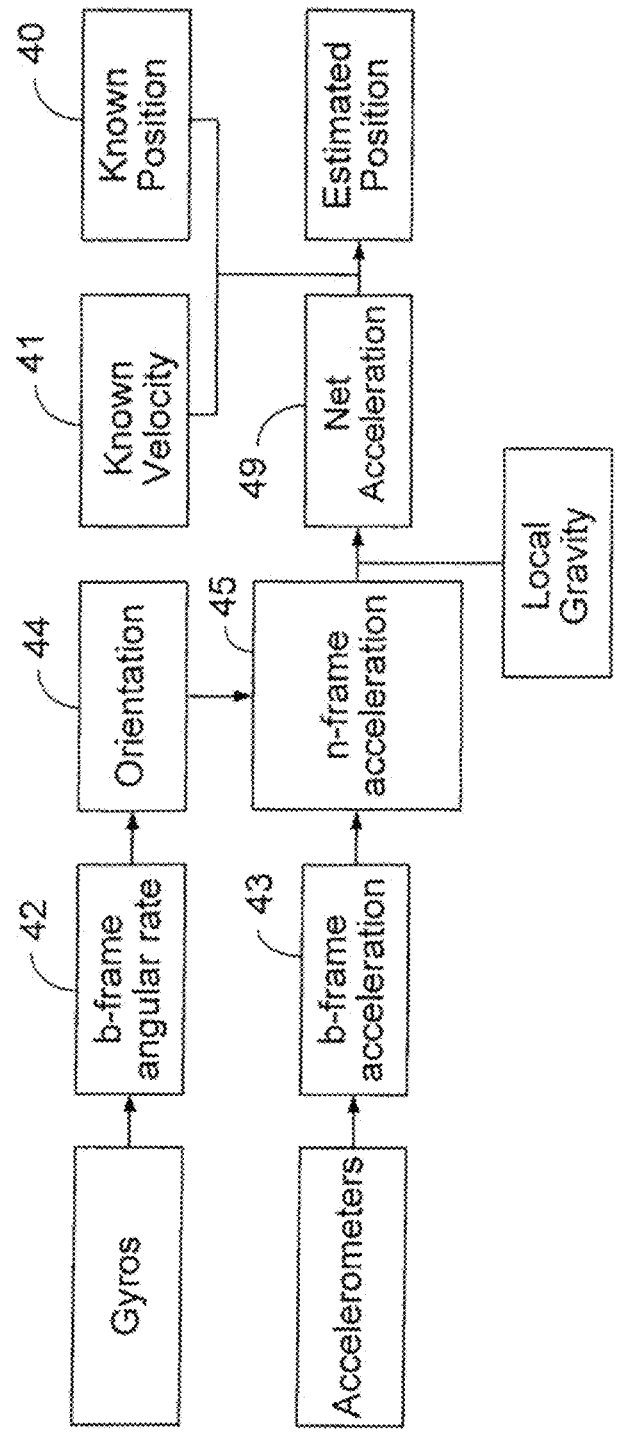
FIG. 4 is a schematic view of a general dead-reckoning system.

Referring to FIG. 4, the navigation system 10 is able to use signals provided by the measurement unit 11 to generally determine the position and orientation of the pedestrian by dead reckoning. Except for the modifications involving pseudo-measurements or transfer alignment described below, the navigation system 10 tracks the pedestrian as follows. Starting with a known position 40 and a known velocity 41, the inertial instruments of measurement unit 11 periodically samples the b-frame angular rate 42 and linear acceleration 43. The b-frame angular rate 42 is integrated to determine the measurement unit's orientation 44. The b-frame linear acceleration 43 is converted to n-frame acceleration 45 by making use of the orientation 44, which relates the b-frame to the n-frame. The n-frame acceleration 45 is combined with local gravity to produce net linear acceleration 49. The net linear acceleration 49 is twice integrated (using the known velocity 41 and position 40 as initial conditions for the respective integrations) to determine a new velocity and position of the pedestrian.

Typically, the inertial instruments take measurements at a sampling rate between 100 and 600 Hz, and the pedestrian's position, velocity, etc. are updated by the processor 12 after each measurement. Other sampling rates are also possible; slower sampling rates may result in reduced accuracy due to numerical integration error. The magnetic instruments preferably take measurements only during the stance phase of the step. As discussed more fully below, magnetic measurements are susceptible to different sources of inaccuracy than the inertial instruments, and the relatively slow sampling rate of the magnetic instruments helps avoid over-reliance on any particular inaccurate measurement.

Enhancements of Dead Reckoning

One way the navigation system 10 tracks the pedestrian is by a prediction/correction algorithm. Such an algorithm generally operates in two phases. During the "prediction" phase, the navigation system 10 predicts the position and orientation that the measurement unit 11 will have when the next measurement is made. During the "correction" phase, the navigation system adjusts the previously-made prediction of the measurement unit's position and orientation, in light of the most recent measurement. Prediction/correction algorithms may be implemented, e.g., by an extended Kalman filter. Examples are described in detail in Appendix A.

The outputs of the inertial instruments in the measurement unit 11 tend to drift over time. Instrument drift results in reduced accuracy of the measurements made by the instrument, and consequently in reduced accuracy in the position and orientation determinations made by the navigation system 10.

One way the effect of instrument drift can be reduced is by recalibrating the drifting instruments at times when the result of a given measurement is known from another source. For example, such a source is the pedestrian's natural body mechanics while walking or crawling. While walking, the pedestrian's foot periodically enters a "stance" phase, when it is motionless on the ground. During this phase, the measurement unit 11 mounted on the foot also remains motionless. In Appendix A, detecting the stance phase, as well as recalibrating the measurement unit 11, is described.

Another way to reduce the effect of instrument drift is by using an external source of data in addition to the drifting instruments. For example, global navigation satellite systems (such as GPS, Glonass, Galileo, etc.) can provide another source of data, when such sources are available. Other external sources of data include beacons present in the pedestrian's environment and map correlation techniques. Recalibrating the measurement unit based on these sources is described in detail in Appendix A.

The magnetic instruments $32x$, $32y$, $32z$ can also be used to manage the drifting inertial instruments. To enhance the effectiveness of this technique, the magnetometers $32x$, $32y$, $32z$ are calibrated. During the calibration, the magnetometers $32x$, $32y$, $32z$ are aligned with true north (as opposed to magnetic north) using global navigation satellites, or another technique. Additionally, magnetic distortions (such as those due to metal in the pedestrian's boot near the magnetometers $32x$, $32y$, $32z$) are accounted for. The calibration of the magnetometers is described in detail in Appendix A.

Applications to Determining Head Position or Position of a Carried Object

In some situations, an estimate of the head position of the pedestrian, or the position of a carried object, is needed with greater precision than can be directly provided by navigation system 10, due to the variable relative position between the navigation system 10 and the pedestrian's head or carried object. For example, the navigation system 10 may be installed on a soldier, and the position of the soldier's rifle must also be known. In Appendix A, the a solution is formulated as tracking the pedestrian's head, but it will be understood that the solutions are equally applicable to a carried object.

Figure 5:
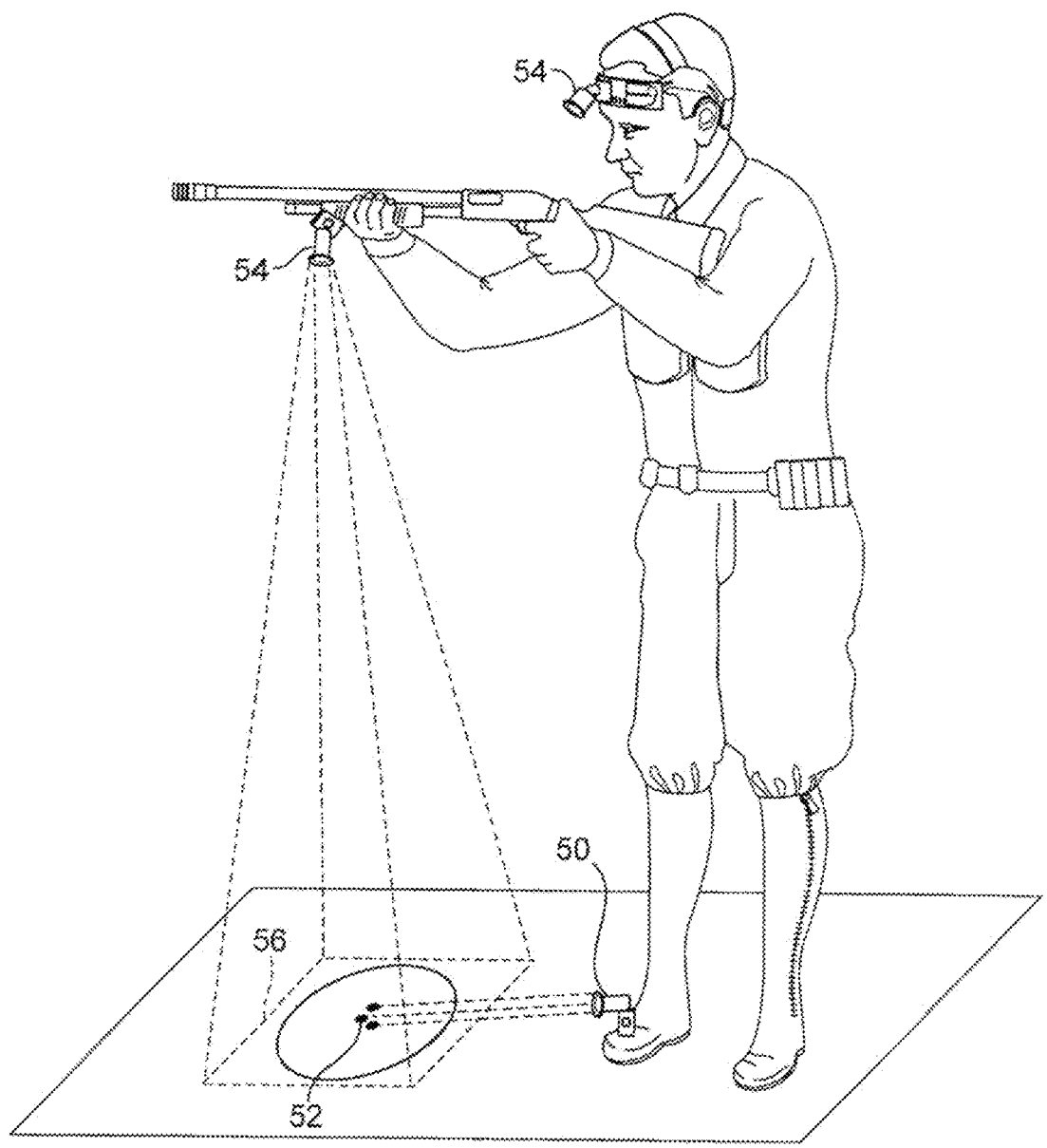
FIG. 5 is a schematic view of a pedestrian with head tracking equipment.

Referring to FIG. 5, one general approach is to equip the navigation unit 10 with a light source 50. The light source 50 projects an image 52 which is detected by a camera 54 mounted on the head of the pedestrian, or on an object the pedestrian is carrying. Based on the location of the image 52 within the field of view 56 of the camera 54, the spatial relationship of the head of the pedestrian or the object carried by the pedestrian relative to the navigation unit 10 can be determined.

Crawling and Running

The navigation unit described in Appendix A was tested on a normal walking user. However, there is nothing inherent in the navigation system that requires normal walking. Unlike a pedometer, it requires no user stride calibration, and it already works fine with backwards or sideways walking or any other motion in which the foot periodically becomes still for about ¼ second.

With some refinement to the algorithm that detects the moments of zero velocity, it should be possible to obtain ZVUs (see Appendix A) for each footfall even for a running user. During running, the foot does not remain stationary for approximately 0.5 second during stance phase as it does for a walking user. However, there is a least one instant during which the heel and ball of the foot are both in contact with the ground. At this moment the translational velocity of the foot is zero in all three axes, and a ZVU may be entered into the Kalman filter just as it is done for a walking user. Unlike the technique which has been described for the walking user which involves counting "stillTime" and beginning a gradual zero-velocity updating process once the stillTime exceeds a threshold, the ZVU must be entered much more quickly, perhaps in a single Kalman filter update, because the foot is still for such a short time. Therefore, one approach is to identify the moment that the foot is most securely in contact with the ground (or most likely to be at the closest to zero velocity) by other means than analyzing accumulated still-Time. For example, the moment of "heel strike" and "toe off" can be recognized by looking at characteristic spikes in the time trace of the accelerometer outputs. Thus, one approach is to identify the moment of maximum contact some time after it occurred by analyzing the recent history of gyro and accelerometer signals that have been stored in a buffer, and perform pattern matching algorithms on the data to find a characteristic signature.

In this case, the zero-velocity update is entered into the Kalman filter at the moment when the velocity is actually zero. One way to do this is to buffer up about half a second of data from all the sensors in a first-in-first-out (FIFO) buffer, and then run the software algorithms on the data coming out the back end of the FIFO, which is delayed by 0.5 seconds. This gives the system the ability to "see into the future" half a second to preview the coming sensor data and perform non-causal pattern matching algorithms which are based on both past and up-coming sensor data to determine whether the current point is a zero-velocity point. The position tracking data from the system will be delayed slightly, which may be tolerable in many navigation applications. If it is not, then at each cycle the sensor data in the buffer can be used to forward predict position to the true current time.

For crawling users, the foot only touches the ground at the toe, but not simultaneously at the toe and heel. In some cases, even during the equivalent of "stance phase" when the toe is more or less stationary on the ground, that the boot is wobbling or rotating about the point of contact, so that the linear velocity at the location where the sensor is mounted may not be exactly zero. A solution to this problem is to mount another sensor on a hand or a knee pad which is much more likely to become motionless periodically during the crawling motion. If, however, a user may be alternately crawling and walking (or running) and it is desired to track both crawling and bipedal gaits with the same shoe-mounted sensor, then it one solution is to adapt the zero-velocity update algorithm to provide sufficient performance despite the slight wobbling of the foot during the crawling "stance phase." For example, the velocity in the forward direction of motion and the vertical direction would be substantially zero, as most of the rocking motion of the heel during toe-touch would be left and right. In some examples, the navigation unit employs a 2-D zero-velocity update with somewhat larger measurement noise to accommodate the fact that even these two velocity components may not be exactly zero.

Whole System in Shoe

In the description of the navigation system 10 above and in Appendix A, it has been explained that the inertial sensor unit must be attached to a user's footwear, but the GPS receiver and the processor which integrates the data and performs the navigation algorithms might be placed anywhere on the body, for example on a belt or in a backpack. One other choice is to combine all of the components into one compact and self-contained module to be mounted on the shoe. We estimate that the MEMS inertial measurement unit, magnetometers, GPS receiver, a digital signal processor (DSP) or microcontroller, an RE communications link and a battery could all be integrated in a package small enough to fit comfortably on a shoe using today's technology. By using BlueTooth™ as the RF communications link, the self-contained navigation unit on the shoe could report user position directly into a user's cellphone or PDA. This enables many interesting applications, such as location-based services and accurate E911 service in GPS-denied environments.

Another advantage of integrating more of the electronics in the shoe-mounted package is that power may be harvested from the user's walking or running motion using electrical generators integrated into the shoe. Such generators can directly power the electronics or continuously recharge a battery or supercapacitor, without the need to run power wires up the user's leg.

Measurement Units on Both Feet/Inter-Foot Ranging

If one were to wear identical measurement units on each foot operating autonomously, they would each drift randomly in different directions. Averaging the two positions would be expected to yield an R.S.S. estimation error reduced by a factor of $\sqrt{2}$. However, this simple averaging ignores additional information that could be incorporated into the filter to further restrain errors, such as the fact that the two feet are normally not more than a meter apart. One way to take advantage of such inter-foot constraints is to design a centralized Kalman filter combining the states of both measurement units, and impose inter-foot constraints as measurements that relate through the observation matrix to position states of both feet. In the case where there is no actual hardware to measure the distance between the feet, the navigation system can impose the maximum separation constraint by making a pseudo-measurement specifying the distance equals the maximum separation (for example, 1 meter) whenever the predicted distance is greater than the maximum separation.

Furthermore, the navigation unit 10 can be equipped with additional hardware to make 1-D range measurements or 3-D position measurements between one foot and the other, and feed these measurements at a high rate into the combined Kalman filter. This would probably result in improvement in dead-reckoning accuracy, because it would essentially allow one foot that is stationary to track the precise displacement of the moving foot (assuming 3-D position measurement) thus providing another subsystem for dead-reckoning in addition to the inertial instruments, with different error characteristics.

InterSense Inc. of Bedford, Mass., possesses ultrasonic ranging technology, used in the IS-900 products, that is capable of range resolution of about 0.3 mm on short sub-meter distances. By arranging just one emitter on one foot and one receiver on the other to provide continuous inter-foot 1-D range measurements, and fusing these with two inertial navigation systems combined in one Kalman filter, dead-reckoning errors may be reduced. For low-cost MEMS inertial systems, the scale-factor error in measuring the stride length by pure open loop inertial navigation is on the order of 0.5%. However, the ultrasonic ranging scale factor error may be on the order of 0.1% with proper temperature compensation. Thus, using this approach, error accumulation due to stride length errors may be the reduced, as well as reducing heading errors and consequential navigation errors indirectly through the Kalman filter.

Appendix A includes examples and experimental results, including a paper published as Foxlin, E, *Pedestrian Tracking with Shoe-Mounted Inertial Sensors*, 38 IEEE Computer Graphics and Applications (November/December 2005), which is hereby incorporated by reference.

Embodiments can be implemented using hardware, software, or a combination of hardware and software. Software embodiments, or software portions of embodiments, can be in the form of instructions on a computer-readable medium for execution on a data processor, such as a digital signal processor or a general purpose microprocessor.

What is claimed is:

1. A method for tracking a handheld or head-mounted item, comprising:
    fixedly positioning an inertial navigation unit attached to a pedestrian's foot;
    making a measurement related to a position of the navigation unit;
    updating a position and/or orientation of the handheld or head-mounted item to be tracked, based at least in part on the measurement, wherein updating a position and/or orientation of the item comprises determining a position of the item relative to the navigation unit.

2. The method of claim 1, further comprising making a second measurement related to a position and/or orientation of the item relative to the navigation unit and using said second measurement in said updating.

3. The method of claim 2 wherein the item to be tracked comprises a head of the pedestrian.

4. The method of claim 2 wherein the item to be tracked comprises an object carried by the pedestrian.

5. The method of claim 2 wherein making said second measurement comprises detecting a light source using a camera.

6. The method of claim 5, wherein the navigation unit comprises the light source.

7. The method of claim 5 wherein the camera further comprises an optical filter that is opaque to substantially all wavelengths of light except wavelengths of the light source.

8. The method of claim 2 wherein updating a position and/or orientation of the item comprises determining an orientation of the item relative to the navigation unit.

9. The method of claim 2 wherein updating a position and/or orientation of the item comprises determining a position of the item relative to the Earth.

10. The method of claim 2 wherein updating a position and/or orientation of the item comprises determining an orientation of the item relative to the Earth.

11. The method of claim 2, wherein making said second measurement comprises detecting a source of radiated energy using a detector.

12. The method of claim 11, wherein the navigation unit comprises the source of radiated energy.

13. The method of claim 2, wherein updating a position and/or orientation of the item comprises:
    determining a first value representing a position and/or orientation of the item relative to the navigation unit;
    determining a second value representing a position and/or orientation of the navigation unit relative to a fixed navigation frame; and
    using said first and second values to determine a position and/or orientation of the item relative to the fixed navigation frame.

14. A system for tracking a handheld or head-mounted item comprising:
    an inertial navigation unit configured for attachment to a pedestrian's body in a fixed position attached to the pedestrian's foot and capable of measuring a position of the navigation unit relative to a fixed reference frame; and
    a sensor located on the pedestrian's body configured to determine a position and/or orientation of the handheld or head-mounted item relative to the navigation unit.

15. The system of claim 14, wherein the sensor is an optical sensor.

16. The system of claim 15, wherein the optical sensor is a camera.

17. The system of claim 14, further comprising a measurement unit configured to:
    determine a first value representing a position and/or orientation of the item relative to the navigation unit;
    determine a second value representing a position and/or orientation of the navigation unit relative to a fixed navigation frame; and
    use said first and second values to determine a position and/or orientation of the item relative to the fixed navigation frame.

18. A system for tracking a handheld or head-mounted item comprising:
    an inertial navigation unit configured for attachment to a pedestrian's foot and capable of measuring a position and a heading of the navigation unit relative to a fixed reference frame; and
    an orientation sensor located on the pedestrian's body configured to determine the heading of the handheld or head-mounted item by using information about the heading of the navigation unit, wherein determining the heading of the item comprises estimating the relative heading of the item with respect to the navigation unit.

19. The system of claim 18, further comprising using the estimate and the heading of the navigation unit to estimate the heading of the item relative to the fixed reference frame.

20. The system of claim 19 wherein estimating the relative heading comprises comparing readings from a compass on the navigation unit and a compass on the tracked item.

21. The system of claim 19 wherein estimating the relative heading comprises using an optical sensor to measure the items yaw rotation relative to the navigation unit.

22. A method for tracking a handheld or head-mounted item comprising:
    fixing an inertial navigation unit to a pedestrian's foot,
    measuring with said navigation unit a position and a heading of the navigation unit relative to a fixed reference frame; and
    determining a heading of the handheld or head-mounted item by using information about the heading of the navigation unit, wherein determining the heading of the item comprises estimating the relative heading of the item with respect to the navigation unit.

23. The method of claim 22, further comprising using the estimate and the heading of the navigation unit to estimate the heading of the item relative to the fixed reference frame.

24. The method of claim 23, wherein estimating the relative heading comprise comparing readings from a compass on the navigation unit and a compass on the tracked item.

25. The method of claim 23, wherein estimating the relative heading comprises using an optical sensor to measure the item's yaw rotation relative to the navigation unit.

* * * * *